United States Patent
Chang et al.

(10) Patent No.: US 10,090,575 B2
(45) Date of Patent: Oct. 2, 2018

(54) METHOD OF MANUFACTURING A WAVEGUIDE ASSEMBLY BY ADHESIVELY BONDING TWO WAVEGUIDE UNITS AND A WAVEGUIDE STRUCTURE FORMED THEREFROM

(71) Applicants: TennVac Inc., New Taipei (TW); TennMAX America Inc., Vancouver, WA (US)

(72) Inventors: Pai-Lee Chang, New Taipei (TW); Guan-Yu Chen, New Taipei (TW)

(73) Assignees: Tenn Vac Inc., New Taipei (TW); TennMax America Inc., Vancouver, WA (US)

(*) Notice: Subject to any disclaimer, the term of this patent is extended or adjusted under 35 U.S.C. 154(b) by 0 days.

(21) Appl. No.: 15/429,487

(22) Filed: Feb. 10, 2017

(65) Prior Publication Data

US 2018/0151935 A1    May 31, 2018

Related U.S. Application Data

(60) Provisional application No. 62/427,269, filed on Nov. 29, 2016.

(51) Int. Cl.
| | |
|---|---|
| *H01P 3/12* | (2006.01) |
| *C09J 5/04* | (2006.01) |
| *C09J 123/06* | (2006.01) |
| *H01P 11/00* | (2006.01) |
| *H01P 1/04* | (2006.01) |

(52) U.S. Cl.
CPC .............. *H01P 3/12* (2013.01); *C09J 5/04* (2013.01); *C09J 123/06* (2013.01); *H01P 1/042* (2013.01); *H01P 11/002* (2013.01); *C09J 2201/602* (2013.01); *C09J 2423/04* (2013.01)

(58) Field of Classification Search
CPC ......... H01P 3/12; H01P 11/001; H01P 11/002
USPC ....................................................... 333/239
See application file for complete search history.

(56) References Cited

U.S. PATENT DOCUMENTS

| | | | |
|---|---|---|---|
| 6,560,850 B2 * | 5/2003 | St. John et al. | H01P 1/213 156/292 |
| 2006/0214751 A1 * | 9/2006 | Leadley-Brown et al. | H01P 1/042 333/254 |

* cited by examiner

*Primary Examiner* — Benny Lee
(74) *Attorney, Agent, or Firm* — Juan Carlos A. Marquez; Marquez IP Law Office, PLLC

(57) ABSTRACT

The present invention provides a method of manufacturing a waveguide assembly and a structure thereof, wherein the manufacturing method comprises the steps of: providing at least two waveguide units and combining the waveguide units, wherein each waveguide unit has at least one bonding portion formed at a position where each two said waveguide units are combined; and at least one adhesive is applied to the bonding portion to combine the waveguide units into the waveguide assembly. With the practice of the present invention, many advanced functions such as rapid design, rapid manufacture, rapid verification and cost reduction can be achieved.

10 Claims, 11 Drawing Sheets

METHOD OF MANUFACTURING A WAVEGUIDE ASSEMBLY BY ADHESIVELY BONDING TWO WAVEGUIDE UNITS AND A WAVEGUIDE STRUCTURE FORMED THEREFROM

BACKGROUND OF THE INVENTION

1. Technical Field

The present invention relates to a method of a manufacturing waveguide assembly and a structure thereof. More particular, the present invention relates to a method of manufacturing a waveguide assembly and a structure thereof for transmitting microwaves or electromagnetic waves.

2. Description of Related Art

FIGS. 1 to 6 and FIGS. 7A to 7B are conventional waveguides 101. In order to apply to difference applications, a conventional waveguide 101 is required not only to have a variety of designs but also to transmit electromagnetic waves effectively. Therefore, the waveguide 101 needs to be made in one-piece by molding or welding and the inner wall of the waveguide 101 has to be polished precisely after welding.

When the waveguide 101 is manufactured into a rotating shape body, a slender shape body, or a complex shape body, a conventional manufacturing method of one-piece molding or polishing after welding encounters a lot of difficulties in many tiny places, deep areas, corners, bending portions, and welding portions 1011 (FIG. 7B).

SUMMARY OF THE INVENTION

The present invention discloses a method of manufacturing a waveguide assembly and a structure thereof, which are mainly to solve the various problems of manufacturing the waveguide which has complex shape, multi-bending portions, and the fine diameter.

The present invention provides a method of manufacturing a waveguide assembly, comprising the steps of: providing at least two waveguide units, wherein each waveguide unit has at least one bonding portion formed at a position where every two waveguide units are combined; and combining the waveguide units by applying at least one adhesive to the bonding portion to combine the waveguide units into the waveguide assembly.

The present invention also provides a waveguide assembly structure, comprising: at least two waveguide units, wherein each waveguide unit has at least one bonding portion formed at a position where every two waveguide units are combined; and at least one adhesive applied to the bonding portion to combine the waveguide units into the waveguide assembly.

Implementation of the present invention at least involves the following inventive steps:

First, with the open-type design of the waveguide units, the waveguide units to be machined can be more easily processed, polished and so on, and then the final processed waveguide units can be combined into one piece; thus, the difficulty of the above-mentioned processing can be overcome;

Second, a significant reduction in manufacturing costs: because the manufacturing process of the waveguide assembly structure is changed, the processing difficulty is greatly reduced, so the manufacturing costs can be significantly cut down, the production efficiency is improved, and the manufacturing yield is increased;

Third, the storage and transportation costs can be reduced: because the conventional waveguides are integrally formed structures, many hollow portions of the waveguides lead to unnecessary charges when the freight and warehousing costs are based on the volume of the conventional waveguides during storage and transportation; and Fourth, the convenient verification: with an assembly design, products development can be more easily changed in design, especially in the early design stage. When the design needs repeated verifications and corrections, designers can more quickly and conveniently complete the verifications and adjustments.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

DETAILED DESCRIPTION OF THE INVENTION

Figure 1:
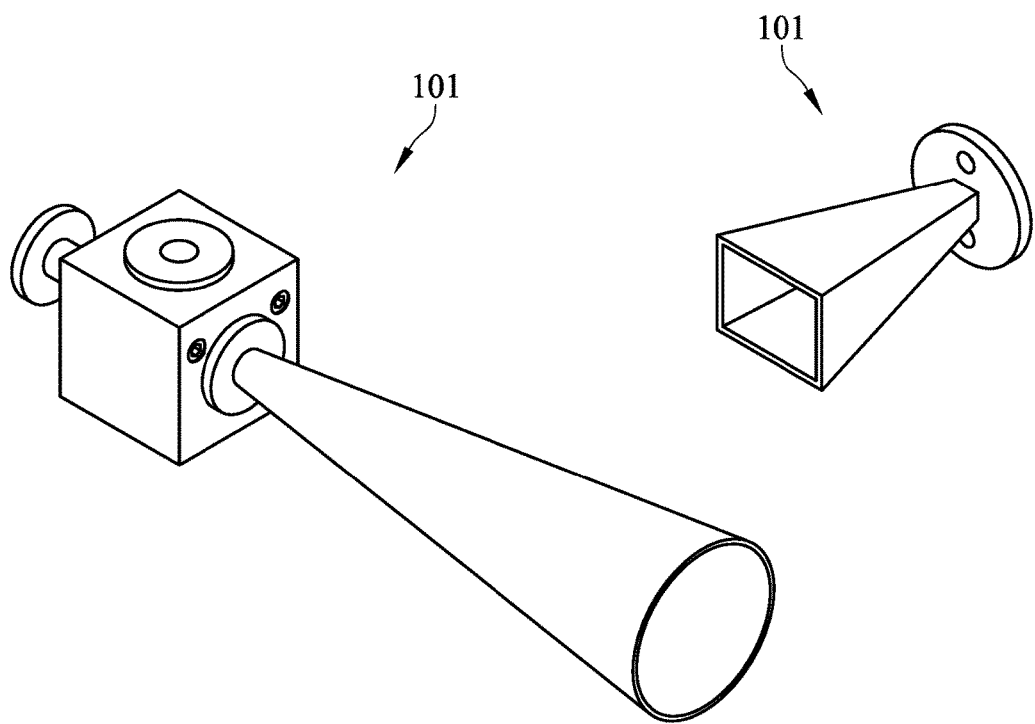
FIGS. 1 to 6 and 7A,7B show a conventional waveguide, respectively.
Figure 2:
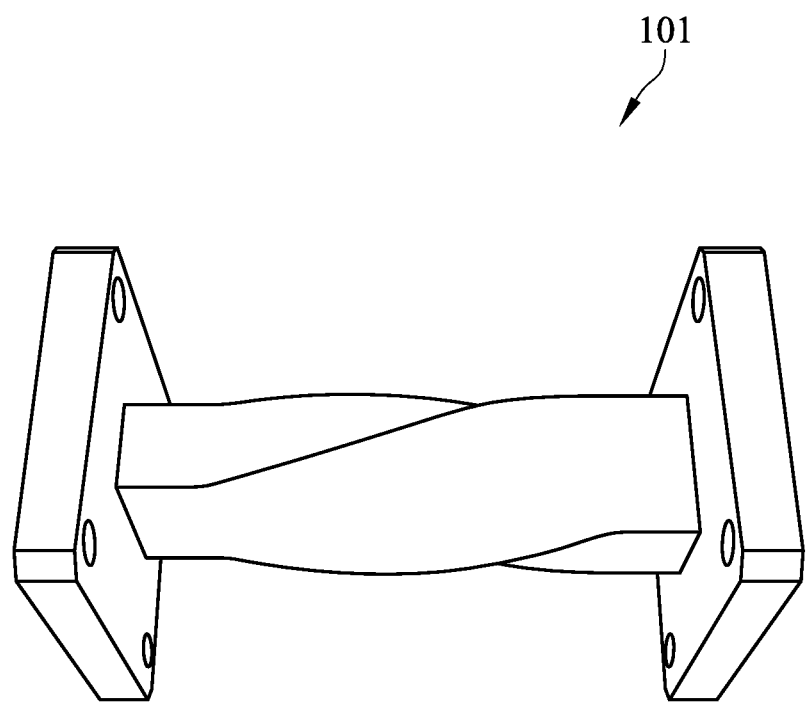
Figure 3:
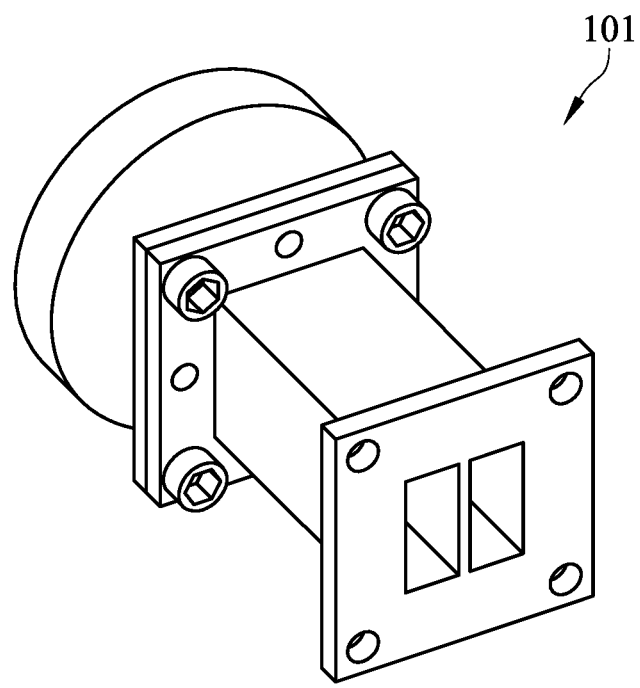
Figure 4:
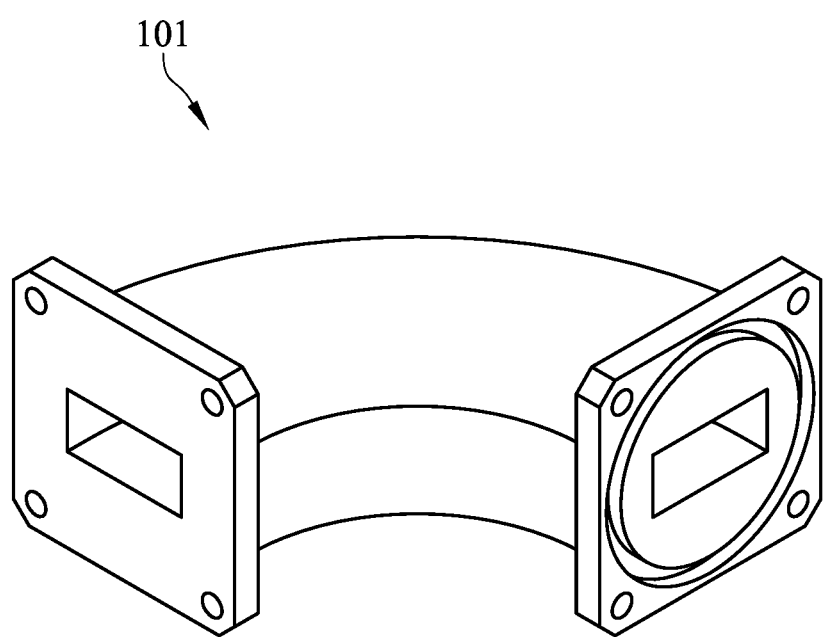
Figure 5:
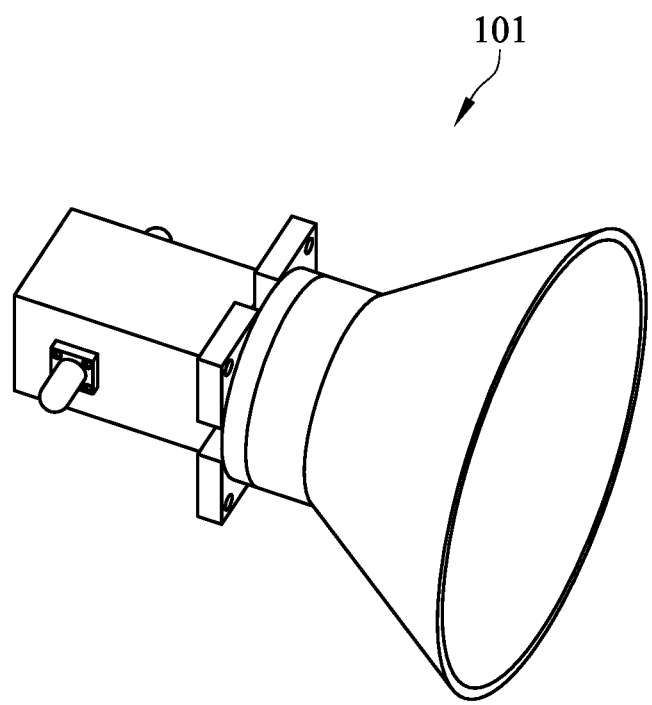
Figure 6:
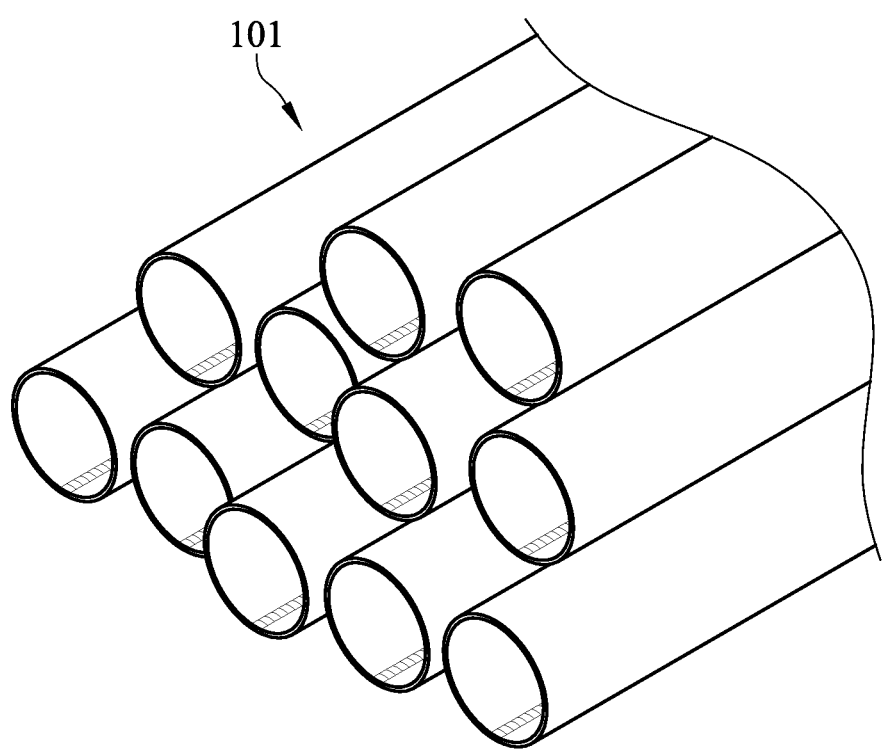
Figure 7A:
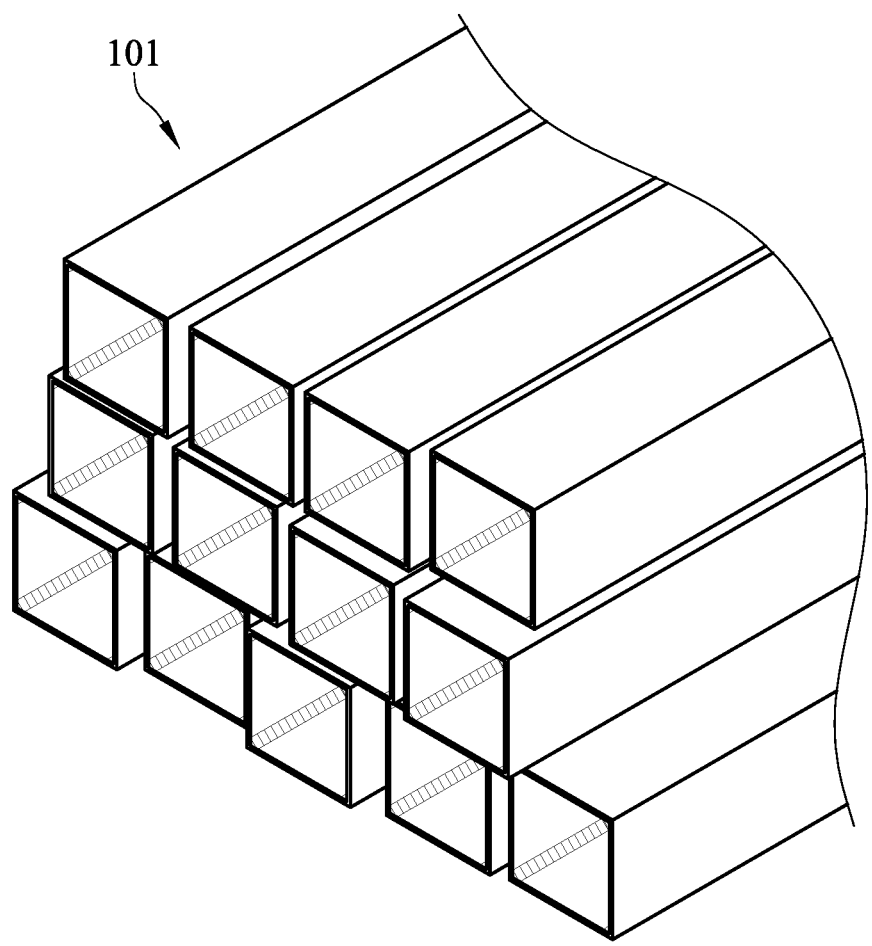
Figure 7B:
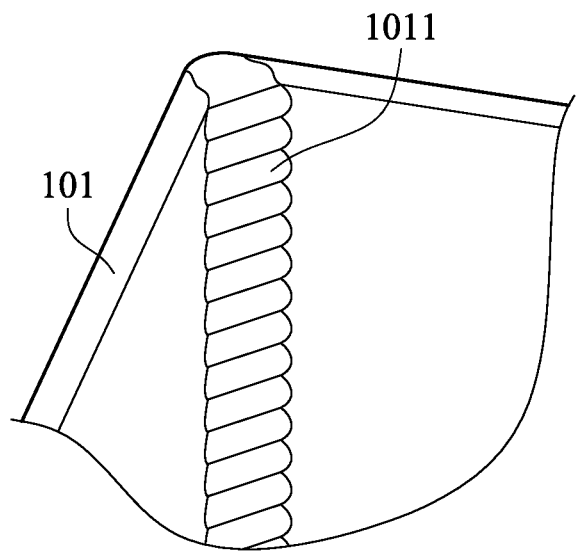
Figure 7C:
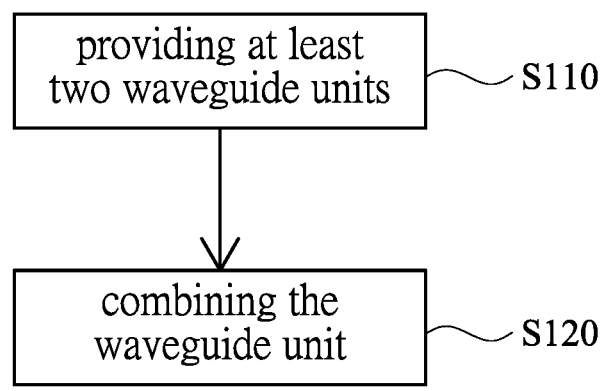
FIG. 7C is a flowchart of a method of manufacturing a waveguide assembly according to an embodiment of the present invention.

As shown in FIG. 7C, a method S100 of manufacturing a waveguide assembly according to an embodiment of the present invention includes the steps of: providing at least two waveguide units (step S110) and combining the waveguide units (step S120).

Figure 8:
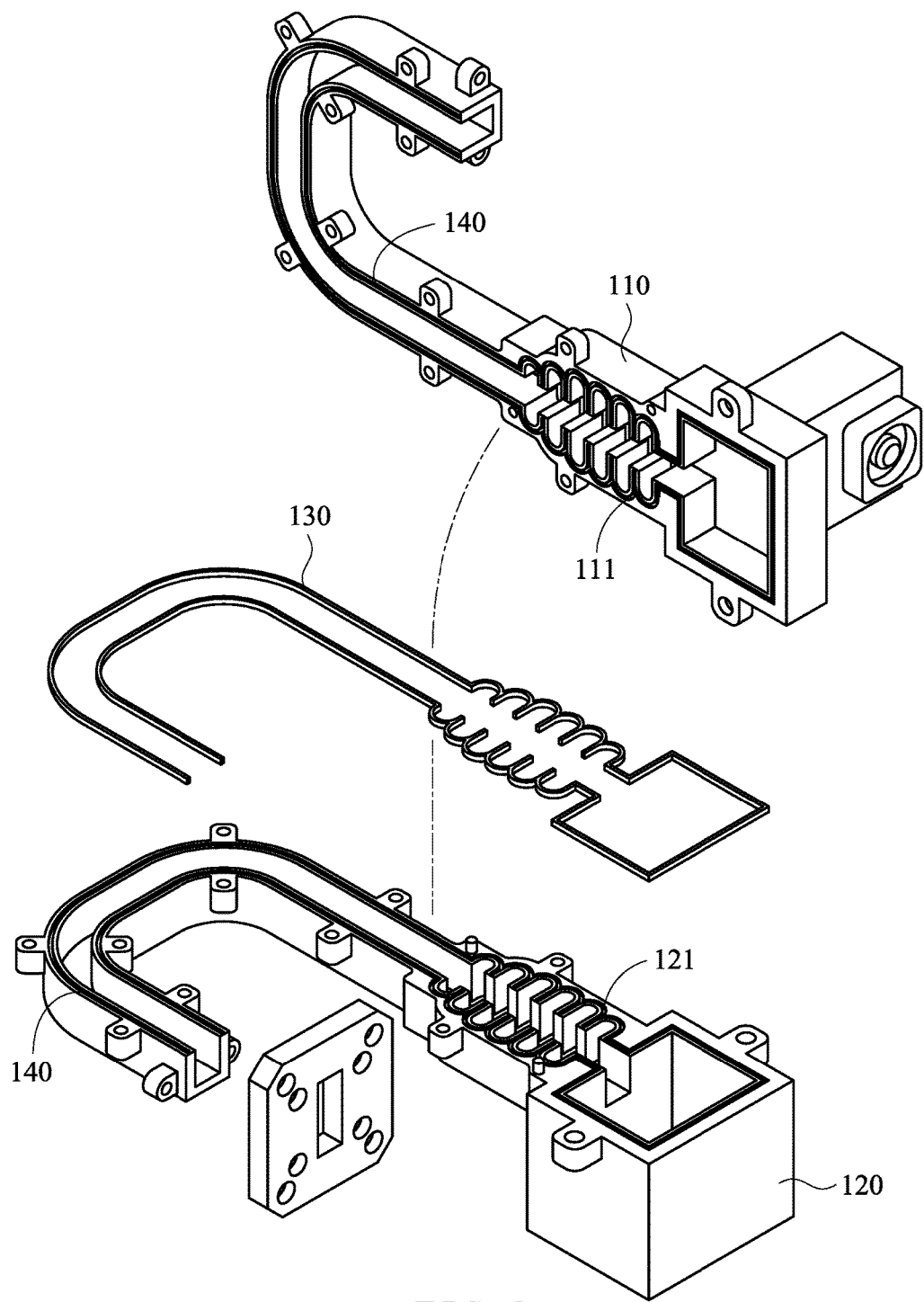
FIG. 8 is an exploded schematic drawing showing a waveguide assembly according to an embodiment of the present invention.
Figure 9:
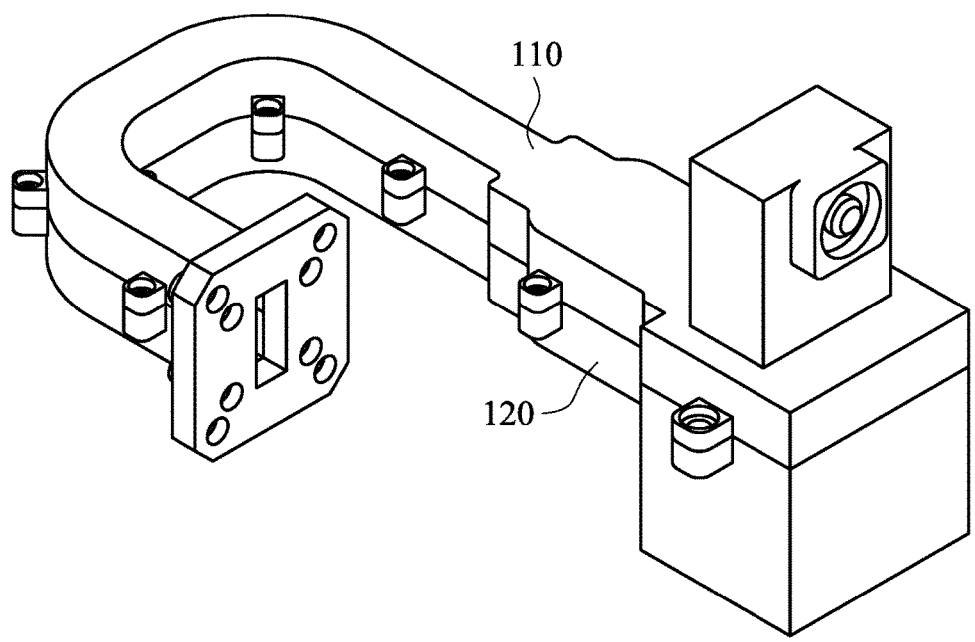
FIG. 9 is a schematic drawing showing a waveguide assembly according to an embodiment of the present invention.

As shown in FIG. 8 and FIG. 9, the step of providing at least two waveguide units (step S110 in FIG. 7C) is to design a waveguide assembly 100 in advance and the waveguide assembly 100 is designed to be connected with at least two waveguide units 110 and 120. Thus, the step of providing at least two waveguide units (step S110) is to provide the at least two waveguide units 110 and 120 mentioned above.

As shown in FIG. 8, since the waveguide assembly 100 is designed to be coupled with at least two waveguide units 110 and 120, therefore at least one bonding portions 111 or 121 of the waveguide units 110 or 120 is formed. In other words, each waveguide unit 110 and 120 has at least one bonding portion 111 and 121 formed at a position where each two said waveguide units are combined.

The step of combining the waveguide units (step S120 in FIG. 7C): in order to combine the waveguide units 110 and 120 effectively into the waveguide assembly 100 and not to affect the normal function of the waveguide assembly 100, at least one adhesive 130 is applied to the bonding portions 111 and 121 to combine and form the waveguide assembly 100.

The adhesive 130 not only effectively combines the waveguide units 110 and 120 into a waveguide assembly 100, but also replaces the welding and polishing processes used in the conventional waveguide manufacturing, thereby to reduce the time and cost of manufacturing the waveguide, and significantly to overcome many difficulties in the design or manufacture the waveguide.

The present invention also provides a structural embodiment of the waveguide assembly 100. The waveguide assembly 100 comprises at least two waveguide units 110 and 120 and at least one adhesive 130.

The waveguide assembly 100 of the present embodiment is continuous with the concept of the above-described method S100 (FIG. 7C) of manufacturing the waveguide assembly, so that the waveguide assembly 100 also includes at least two waveguide units 110 and 120 and the bonding portions 111 and 121 are formed in the same manner.

The at least one adhesive 130 is also applied to the bonding portions 111 and 121 to combine the waveguide units 110 and 120 into the waveguide assembly 100.

The method S100 of manufacturing the waveguide assembly and the waveguide assembly 100 described above has the following features:

In order to operate the waveguide assembly 100 normally with the bonding portions 111 and 121, the adhesive 130 in the embodiments described above can be a conductive adhesive, and particularly the adhesive 130 can be a millimeter-band conductive adhesive, a waterproof LDPE (low density polyethylene) adhesive, or a conductive LDPE adhesive.

In addition, in order to effectively apply the adhesive 130 to the bonding portions 111 and 121, the bonding portions 111 and 121 have the structure of a groove 140, respectively. When the manufacturing method S100 is performed or the waveguide assembly 100 is manufactured, the adhesive 130 is filled into the structure of the groove 140. It can not only prevent the adhesive 130 overflowing but also make the adhesive 130 be formed in a more accurate position to exert its effect.

The adhesive 130 of the present embodiments can be a form-in-place conductive and waterproof colloid or adhesive, being composed of: 9%-12% of dimethyl siloxane or dimethylvinyl-terminated or vinyl terminated polydimethylsiloxane; 12%-15% of hydroxy terminated polydimethylsiloxane; 0%-0.2% of dispersant; 3%-5% of dimethyl, methylhydrogen siloxane crosslinking agent; 0%-0.2% of adhesion promoter; 0%-0.2% of Pt catalyst; 1%-3% of forming agent; 0%-10% of hydrocarbon solvent; 50%-70% of Nickel Graphite; 0%-0.2% of thickening agent; 5%-10% of trimethylated silica; and 0%-0.1% of inhibitor.

When the above-described adhesive 130 is applied to the method S100 of manufacture waveguide assembly or the waveguide assembly 100, it can be dispensed by manual dispensing or with an automatic gluing machine, otherwise the adhesive 130 may be formed into a rubber strip in advance and then formed in the bonding portions 111 and 121. The adhesion strength of the adhesive 130 can be larger than 80 Newtons/cm$^2$.

The above-mentioned adhesive 130 may be a conductive adhesive having the following characteristics: the shielding capability is larger than 100 dB in the frequency spectrum range from 200 MHz to 20 GHz; the minimum width is 0.4 mm; the minimum height is 0.3 mm; and the filling width of the dispensing path is between 0.4 mm and 2 mm.

The embodiments described above are intended only to demonstrate the technical concept and features of the present invention so as to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. A method of manufacturing a waveguide assembly, comprising the steps of:
   providing at least two waveguide units, wherein each waveguide unit has at least one bonding portion formed at a position where each two said waveguide units are combined; and
   combining the at least two waveguide units by applying at least one adhesive to the bonding portion to combine the at least two waveguide units into the waveguide assembly;
   wherein the at least one adhesive is composed of: 9%-12% of dimethyl siloxane or dimethylvinyl-terminated or vinyl terminated polydimethylsiloxane; 12%-15% of hydroxy terminated polydimethylsiloxane; 0%-0.2% of dispersant; 3%-5% of dimethyl, methylhydrogen siloxane crosslinking agent; 0%-0.2% of adhesion promoter; 0%-0.2% of Pt catalyst; 1%-3% of forming agent; 0%-10% of hydrocarbon solvent; 50%-70% of Nickel Graphite; 0%-0.2% of thickening agent; 5%-10% of trimethylated silica; and 0%-0.1% of inhibitor; and
   wherein the adhesion strength of the at least one adhesive is larger than 80 Newtons/cm2; the shielding capability is larger than 100 dB in the frequency spectrum range from 200 MHz to 20 GHz; the minimum width is 0.4 mm; the minimum height is 0.3 mm; and the filling width of the dispensing path is between 0.4 mm and 2 mm.

2. The method according to claim 1, wherein the adhesive is a conductive adhesive.

3. The method according to claim 1, wherein the adhesive is a millimeter-band conductive adhesive.

4. The method according to claim 1, wherein the adhesive is a waterproof adhesive or a conductive adhesive.

5. The method according to claim 1, wherein the bonding portion has a groove and the adhesive is filled into the groove.

6. A waveguide assembly structure, comprising:
   at least two waveguide units, wherein each waveguide unit has at least one bonding portion formed at a position where each two said waveguide units are combined; and
   at least one adhesive applied to the bonding portion to combine the at least two waveguide units into the waveguide assembly;
   wherein the at least one adhesive is composed of: 9%-12% of dimethyl siloxane or dimethylvinyl-terminated or vinyl terminated polydimethylsiloxane; 12%-15% of hydroxy terminated polydimethylsiloxane; 0%-0.2% of dispersant; 3%-5% of dimethyl, methylhydrogen siloxane crosslinking agent; 0%-0.2% of adhesion promoter; 0%-0.2% of Pt catalyst; 1%-3% of forming agent; 0%-10% of hydrocarbon solvent; 50%-70% of Nickel Graphite; 0%-0.2% of thickening agent; 5%-10% of trimethylated silica; and 0%-0.1% of inhibitor; and
   wherein the adhesion strength of the at least one adhesive is larger than 80 Newtons/cm2; the shielding capability is larger than 100 dB in the frequency spectrum range from 200 MHz to 20 GHz; the minimum width is 0.4 mm; the minimum height is 0.3 mm; and the filling width of the dispensing path is between 0.4 mm and 2 mm.

7. The waveguide assembly structure according to claim 6, wherein the adhesive is a conductive adhesive.

8. The waveguide assembly structure according to claim 6, wherein the adhesive is a millimeter-band conductive adhesive.

9. The waveguide assembly structure according to claim 6, wherein the adhesive is a waterproof adhesive or a conductive adhesive.

10. The waveguide assembly structure according to claim 6, wherein the bonding portion has a groove and the adhesive is filled into the groove.

* * * * *